US012222577B2

(12) United States Patent
Nauche et al.

(10) Patent No.: US 12,222,577 B2
(45) Date of Patent: Feb. 11, 2025

(54) OPTICAL DEVICE AND OPTOMETRIC EQUIPMENT COMPRISING SUCH AN OPTICAL DEVICE

(71) Applicant: Essilor International, Charenton-le-Pont (FR)

(72) Inventors: Michel Nauche, Charenton-le-Pont (FR); Salvatore Alaimo, Saint Maur des Fosses (FR)

(73) Assignee: Essilor International, Charenton-le-Pont (FR)

( * ) Notice: Subject to any disclaimer, the term of this patent is extended or adjusted under 35 U.S.C. 154(b) by 0 days.

(21) Appl. No.: 17/627,585

(22) PCT Filed: Jul. 16, 2020

(86) PCT No.: PCT/EP2020/070185
§ 371 (c)(1),
(2) Date: Jan. 14, 2022

(87) PCT Pub. No.: WO2021/013704
PCT Pub. Date: Jan. 28, 2021

(65) Prior Publication Data
US 2022/0269032 A1      Aug. 25, 2022

(30) Foreign Application Priority Data

Jul. 19, 2019   (EP) .................................. 19305965

(51) Int. Cl.
*F16H 55/20*      (2006.01)
*F16H 55/24*      (2006.01)
(Continued)

(52) U.S. Cl.
CPC ............. *G02B 7/023* (2013.01); *F16H 55/24* (2013.01); *F16H 57/021* (2013.01); *F16H 57/12* (2013.01);
(Continued)

(58) Field of Classification Search
CPC ....... G02B 7/023; F16H 55/24; F16H 57/021; F16H 57/12; F16H 2057/0213;
(Continued)

(56) References Cited

U.S. PATENT DOCUMENTS

| 4,523,822 A | * | 6/1985 | Thurston | ............... A61B 3/0285 |
| | | | | 351/234 |
| 4,586,393 A | * | 5/1986 | Mooney | ................. F16M 11/18 |
| | | | | 74/411 |

(Continued)

FOREIGN PATENT DOCUMENTS

| CN | 104914548 A | 9/2015 |
| CN | 107920732 A | 4/2018 |

(Continued)

OTHER PUBLICATIONS

International Search Report issued on Oct. 19, 2020 in PCT/EP2020/070185 filed Jul. 16, 2020, 4 pages.

(Continued)

*Primary Examiner* — Zakaria Elahmadi
(74) *Attorney, Agent, or Firm* — Oblon, McClelland, Maier & Neustadt, L.L.P.

(57) ABSTRACT

An optical device including a lens and a control member configured such that motion of the control member produces a change in the optical power provided along an optical axis of the lens. The optical device further includes a framework, a motor and a driving member. The motor includes an output shaft rotatively coupled to said driving member. The motor and the control member are mounted in the framework such that the driving member and the control member mechanically cooperate. The driving member is rotatably mounted in the framework. The optical device comprises biasing means for maintaining the driving member in a predetermined axial position along the output shaft axis and relative to the (Continued)

framework. This optical device can be used in an optometric equipment.

18 Claims, 2 Drawing Sheets

(51) Int. Cl.
*F16H 57/021* (2012.01)
*F16H 57/12* (2006.01)
*G02B 7/02* (2021.01)

(52) U.S. Cl.
CPC ............... *F16H 2057/0213* (2013.01); *F16H 2057/127* (2013.01)

(58) Field of Classification Search
CPC ....... F16H 2057/127; F16H 2007/0806; F16H 20/2003; F16H 25/2209
See application file for complete search history.

(56) References Cited

U.S. PATENT DOCUMENTS

| | | | |
|---|---|---|---|
| 5,605,071 A | 2/1997 | Buchanan, Jr. | |
| 2002/0148315 A1* | 10/2002 | Mittendorf | F16H 55/24 74/425 |
| 2002/0195893 A1* | 12/2002 | Kobayashi | H02K 7/081 310/83 |
| 2006/0027417 A1* | 2/2006 | Sewaga | B62D 5/04 180/444 |
| 2008/0041178 A1 | 2/2008 | Ozsoylu et al. | |
| 2010/0054101 A1* | 3/2010 | Oe | G11B 7/22 |
| 2010/0181139 A1 | 7/2010 | Tokura et al. | |
| 2015/0097743 A1 | 4/2015 | Evans | |
| 2016/0331226 A1* | 11/2016 | Nauche | G02B 3/14 |
| 2018/0088449 A1* | 3/2018 | Hatano | G03B 21/147 |
| 2018/0112763 A1 | 4/2018 | Paul et al. | |

FOREIGN PATENT DOCUMENTS

| | | |
|---|---|---|
| DE | 10 2009 050 121 A1 | 5/2010 |
| EP | 1 447 305 A2 | 8/2004 |
| EP | 1 881 237 A1 | 1/2008 |
| JP | 62-255618 A | 11/1987 |
| WO | WO 2015/107303 A1 | 7/2015 |

OTHER PUBLICATIONS

Combined Chinese Office Action and Search Report issued Apr. 19, 2024, in corresponding Chinese Patent Application No. 202080043904.6 (with English Translation), 17 pages.

Office Action issued Jun. 7, 2024, in corresponding European Patent Application No. 20 742 250.2, 7 pages.

* cited by examiner

OPTICAL DEVICE AND OPTOMETRIC EQUIPMENT COMPRISING SUCH AN OPTICAL DEVICE

TECHNICAL FIELD OF THE INVENTION

The invention relates to optical devices, in particular optical devices suitable for providing a variable optical power for the correction of ametropia.

More precisely the invention relates to an optical device comprising a lens and a control member configured such that a motion of the control member produces a change in the optical power provided along an optical axis of the lens. The invention also relates to an optometric equipment comprising such an optical device.

BACKGROUND INFORMATION AND PRIOR ART

Document WO2015/107303 describes an optical device as just mentioned.

Such an optical device further comprises a framework, a motor and a driving member, such as a worm screw: said motor includes an output shaft whereon said driving member is affixed, and the motor and the control member (e.g. a toothed wheel) are mounted in the framework such that the driving member and the control member mechanically cooperate.

Thus, by appropriate control of the motor, it is possible to activate the driving member and move the control member (e.g. rotate the toothed wheel) to a position where the lens provides a particular optical power.

Motors used in this context (usually electric motors) are however generally designed with an axial play in the position of their output shaft to ensure proper functioning in a wide range of temperatures.

This axial play however results in an inaccurate positioning of the driving member relative to the framework and thus in an imprecise control of the motion of the control member from the motor.

This is problematic in particular when no information is available as to the actual position of the control member, for instance when motion control is based on an encoder determining the angular position of the output shaft.

SUMMARY OF THE INVENTION

In this context, the invention provides an optical device comprising a lens and a control member configured such that motion of the control member produces a change in the optical power provided along an optical axis of the lens, the optical device further comprising a framework, a motor and a driving member, said motor including an output shaft rotatively coupled to said driving member, the motor and the control member being mounted in the framework such that the driving member and the control member mechanically cooperate, characterised in that the driving member is rotatably mounted in the framework and in that the optical device comprises biasing means for maintaining the driving member in a predetermined axial position along the output shaft axis and relative to the framework.

The driving member is thus precisely positioned and can therefore accurately control motion of the control member, which results in an accurate control of the optical power provided by the optical device.

The optical device may also include one or several of the following features:

the driving member is mounted in the framework by means of at least one rolling bearing;
the biasing means are arranged so as to axially urge the driving member—rolling bearing assembly against a wall of the framework;
the driving member is press fit into an inner race of said at least one rolling bearing;
the biasing means are arranged so as to axially urge an outer race of said at least one rolling bearing against said wall;
the driving member is mounted in the framework by means of said at least one rolling bearing and another rolling bearing;
the biasing means are interposed between the other rolling bearing and the framework such that said at least one rolling bearing is urged against said wall of the framework;
said at least one rolling bearing and the other rolling bearing are respectively mounted on two axial portions of the driving member separated by a threaded axial portion of the driving member;
said at least one rolling bearing and the other rolling bearing are mounted on a first axial portion of the driving member;
the driving member is also mounted to the framework by means of a further rolling bearing;
said further rolling bearing being mounted on a second axial portion of the driving member;
the first axial portion and the second axial portion being separated by a threaded axial portion of the driving member;
the biasing means include a coil spring;
the biasing means include a spring washer;
said biasing means are suitable for exerting along said output shaft axis a biasing force greater than a force exerted by the driving member on the control member for driving the control member into motion;
the optical device further comprises an encoder associated with the motor for determining an angular position of the output shaft;
the driving member is a worm screw;
the control member is a toothed wheel;
the worm screw and the toothed wheel mesh;
the lens is a cylindrical lens rotatable with the control member;
the invention can also provide a lens suitable for providing a variable spherical power adjustable by rotation of the control member.

The invention also provides an optometric equipment (e.g. a refractor) comprising an optical device.

DETAILED DESCRIPTION OF EXAMPLE(S)

Illustrative embodiments of the present invention are described in detail below with reference to the attached drawing Figures, wherein FIG. 1 is a functional representation of an optical device according to a possible embodiment of the invention;

Figure 1:
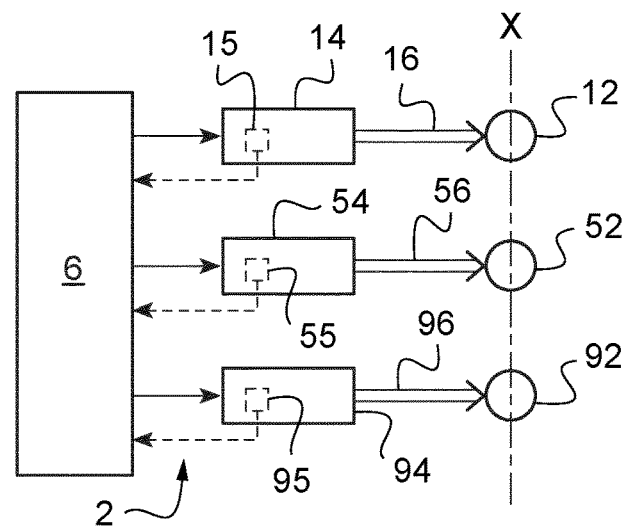
FIG. 1 represents elements of an optical device 2 constructed in accordance with the teachings of the invention.

Such an optical device 2 includes at least a lens 12; 52; 92, at least a motor 14; 54; 94 and at least a transmission system 16; 56; 96 configured to move at least a portion of the lens 12; 52; 92 and thereby change the optical power provided along an optical axis X of the lens 12; 52; 92 when the motor 14; 54; 94 is operated.

In the present example, the optical device 2 includes:
- a first motor 14, a lens 12 having a variable spherical power (along the optical axis X of the lens 12) and a first transmission system 16 configured to rotate a ring of the lens 12 and change the spherical power (along the optical axis X of the lens 12) when the first motor 14 is operated;
- a second motor 54, a first cylindrical lens 52 (i.e. a lens having a cylindrical power along the optical axis X of the lens 52) and a second transmission system 56 configured to rotate the first cylindrical lens 52 to change the optical power (here the axis of the cylindrical correction) when the second motor 54 is operated;
- a third motor 94, a second cylindrical lens 92 (i.e. a lens having a cylindrical power along the optical axis X of the lens 52) and a third transmission system 96 configured to rotate the second cylindrical lens 92 to change the optical power (here the axis of the cylindrical correction) when the second motor 54 is operated.

These elements are mounted in a framework 8 of the optical device 2 such that the lens 12 having a variable spherical power, the first cylindrical lens 52 and the second cylindrical lens 92 have the same optical axis X (as schematically represented in FIG. 1). Reference can be made to document WO2015/107303 for further details on this aspect.

As shown in FIG. 1, the optical device 2 also includes a control circuit 6 designed to control motion of the motor(s), here of the first motor 14, of the second motor 54, and of the third motor 94, such that the lens or combination of lenses 12, 52, 92 provides a sought optical power, as explained in document WO2015/107303.

The optical device 2 can thus be used to provide a predefined optical correction to an eye of a person (when this eye is situated along the optical axis X). The optical device 2 can thus be included in an optical equipment, such as a refractor (or phoropter), to be used for instance when subjecting a patient to a subjective refraction test.

In the present embodiment, each motor 14; 54; 94 includes an encoder for determining an angular position of the output shaft 18; 58 of the concerned motor 14; 54; 94 and for transmitting an item of information representing this angular position to the control circuit 6 (based on which the control circuit 6 can precisely control the position of the concerned output shaft 18; 58).

The first transmission system 16 and the second transmission system 56 will now be described with reference to FIGS. 2 to 5. The third transmission system 96 is constructed in a manner identical to the second transmission system 56 and will not therefore be further described.

Each transmission system 16; 56 comprises a driving member 20; 60 rotatively coupled to the output shaft 18; 58 of the corresponding motor 14; 54 and a control member 22; 62 designed so as to produce, when moving, a change in the optical power provided along an optical axis X of the concerned lens 12; 52.

The driving member 20; 60 is mounted with respect to the output shaft 18; 58 of the corresponding motor 14; 54 so as to be connected or affixed to the output shaft 18; 58 such that the driving member 20; 60 and the output shaft 18; 58 are coupled when rotating (i.e. when the corresponding motor 14; 54 operates) around the output shaft axis. The driving member 20; 60 may however in practice be mounted with respect to the output shaft 18; 58 so as to move in translation with respect to the output shaft 18; 58 along the axis of the output shaft 18; 58.

In the present embodiment, the driving member 20; 60 is a worm screw. This worm screw 20; 60 is here affixed to the output shaft 18; 58 with the axis of the worm screw 20; 60 extending along the axis of the output shaft 18; 58, such that rotation of the output shaft 18; 58 (when operating the motor 14; 54) results in rotation of the worm screw 20; 60 (around the axis of the worm screw 20; 60).

In the present embodiment, the control member 22; 62 is a toothed wheel. This toothed wheel 22; 62 meshes with the worm screw 20; 60 such that rotation of the worm screw 20; 60 (around the axis of the worm screw 20; 60) produces a rotation of the toothed wheel 22; 62 around the axis of the toothed wheel 22; 62 (the axis of the toothed wheel 22; 62 being perpendicular to the axis of the worm screw 20; 60, i.e. perpendicular to the axis of the output shaft 18; 58 of the motor 14; 54, and/or being situated at a distance from the axis of the worm screw 20; 60).

Figure 2:
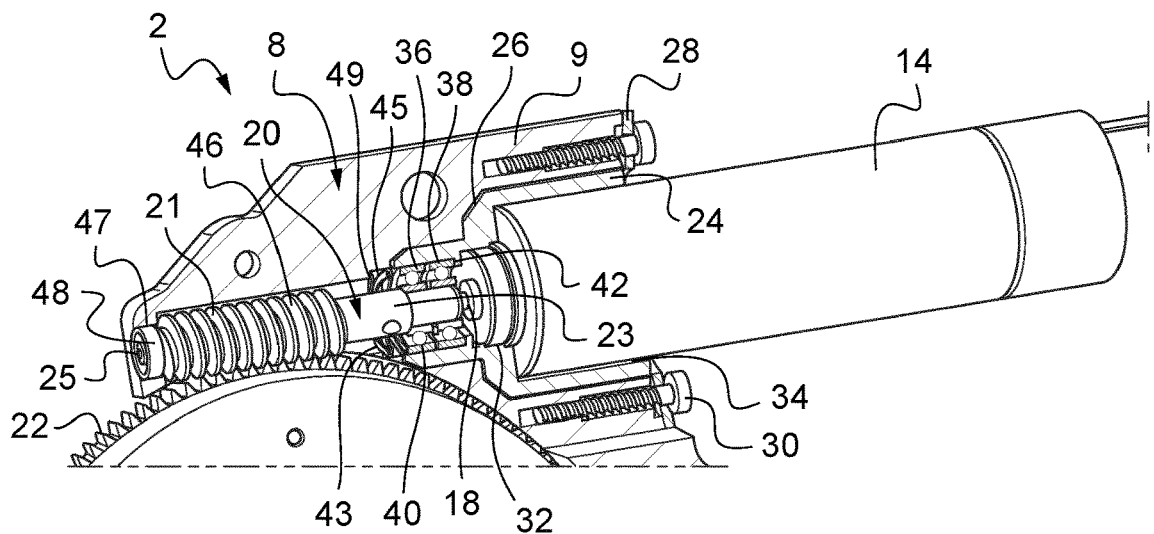
FIG. 2 is a partial view of a first transmission system of the optical device of FIG. 1.
Figure 3:
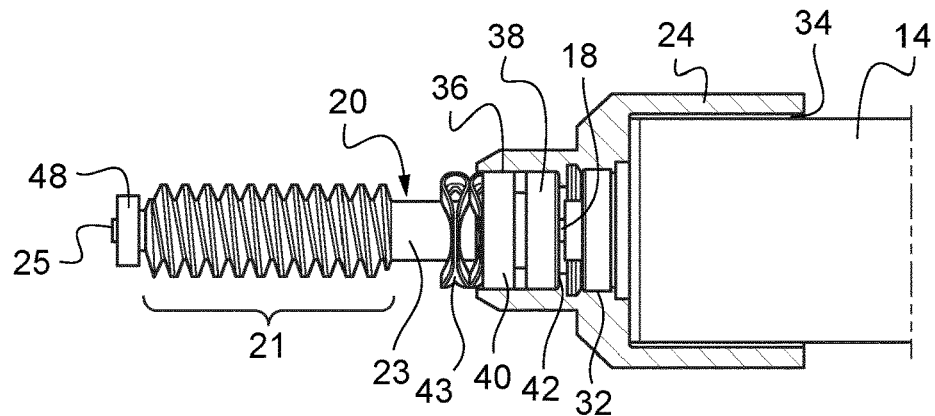
FIG. 3 is a side view of the first transmission system.

FIGS. 2 and 3 show details of the first transmission system 16.

As visible in FIG. 2, in the present embodiment, the framework 8 comprises a frame 9 and a sleeve 24. The frame 9 is for instance made of a plastic material, such as polyether ether ketone (PEEK). The sleeve 24 is for instance made of metal, e.g. stainless steel.

The sleeve 24 is for instance received in a complementary recess 26 formed in the frame 9 and retained in this complementary recess 26 thanks to a ring 28 affixed to the frame 9 by means of screws 30.

The sleeve 24 defines a through aperture 32 through which the output shaft 18 of the motor 14 and the driving member 20 extend. The through aperture 32 comprises a first cylindrical portion 34 for partly accommodating the motor 14 and a second cylindrical portion 36 for accommodating a rolling bearing at least (here two rolling bearings 38, 40).

The sleeve 24 forms a ring-shaped wall 42 at an axial end of the second cylindrical portion 36 for a bearing 38 to abut, as further explained below.

The frame 9 defines a cavity 44 communicating with the recess 26. In the present embodiment, the cavity 44 comprises (sequentially along an axis of the cavity 44, from a portion situated near the recess 26 to a portion situated away from the recess 26):
- a first cylindrical portion 45 having a first diameter;
- a second cylindrical portion 46 having a second diameter smaller than the first diameter; and, here,
- a third cylindrical portion 47 having a third diameter smaller than the second diameter.

The first cylindrical portion 45 accommodates in the present example a spring washer 43. The frame 9 has a ring shaped wall 49 (connecting the first cylindrical portion 45 and the second cylindrical portion 46, i.e. formed by the difference in diameter between the first cylindrical portion 45 and the second cylindrical portion 46).

The spring washer 43 is thus held (axially) between the wall 49 and the outer race of the rolling bearing 40 and presses the rolling bearing assembly 38, 40 against the wall 42 formed in framework 8 (here in the sleeve 24).

A further rolling bearing 48 is accommodated in the cavity at the level of the third cylindrical portion 47. The rolling bearing 48 is able to translate axially under the force of the spring washer 43 and is mounted tight on the driving member 20.

The driving member 20 comprises a first axial portion 23, a second axial portion 25 and a threaded portion 21 separating (i.e. extending between, here along the axis of the driving member 20) the first axial portion 23 and the second axial portion 25.

The second cylindrical portion 46 has a diameter (second diameter as mentioned above) larger than the external diameter of the threaded portion 21 of the driving member 20 (for the cavity 44 to accommodate the driving member 20).

The rolling bearings 38, 40 are mounted on the first axial portion 23 of the driving member 20. Precisely here, the first axial portion 23 of the driving member 20 is press fit into respective inner races of the rolling bearings 38, 40.

The further rolling bearing 48 is mounted on the second axial portion 25 of the driving member 20. Precisely here, the second axial portion 25 of the driving member 20 is press fit into the inner race of the further rolling bearing 48.

The driving member 20 is thus rotatably mounted in the framework 8 (rotating around an axis of the driving member 20, corresponding here to the output shaft axis).

Thanks to the construction just described, as the rolling bearing assembly 38, 40 is urged against the wall 42 of the framework 8 thanks to the spring washer 43 and the driving member 20 is press fit into inner races of the rolling bearings 38, 40, the driving member 20 is maintained in a predetermined axial position along the axis of the output shaft 18 (identical here to the axis of the driving member 20) relative to the framework 8.

The spring washer 43 may for instance be selected so as to exert, along the axis of the output shaft 18, a biasing force greater than a force exerted by the driving member 20 on the control member 22 for driving the control member 22 into motion (for example, three times greater than said force exerted by the driving member 20 or more, here four times greater than said force exerted by the driving member 20 or more).

The stiffness of the spring is dimensioned/chosen so that the thermal expansions do not significantly influence the biasing force exerted by the spring washer 43 along the axis of the output shaft 18.

For example, the force exerted by the driving member 20 on the control member 22 for driving the control member 22 into motion is between 0.05 N and 0.2 N, here 0.1 N; the biasing force exerted by the spring washer 43 along the axis of the output shaft 18 is between 0.2 N and 1 N, here 0.4 N.

Motion of the control member 22 (here by rotation) can thus be precisely controlled by corresponding motion of the driving member 20 (itself driven by the motor 14). Control of the optical power (here of the spherical power) provided by the lens 12 along the lens axis X is thus improved.

In the present case, rotation of the control member 22 is converted into a translation movement by a screw arrangement (not shown), this translation movement producing the deformation of a deformable membrane (not shown) of the lens 12, thus varying the spherical power of the lens 12.

Figure 4:
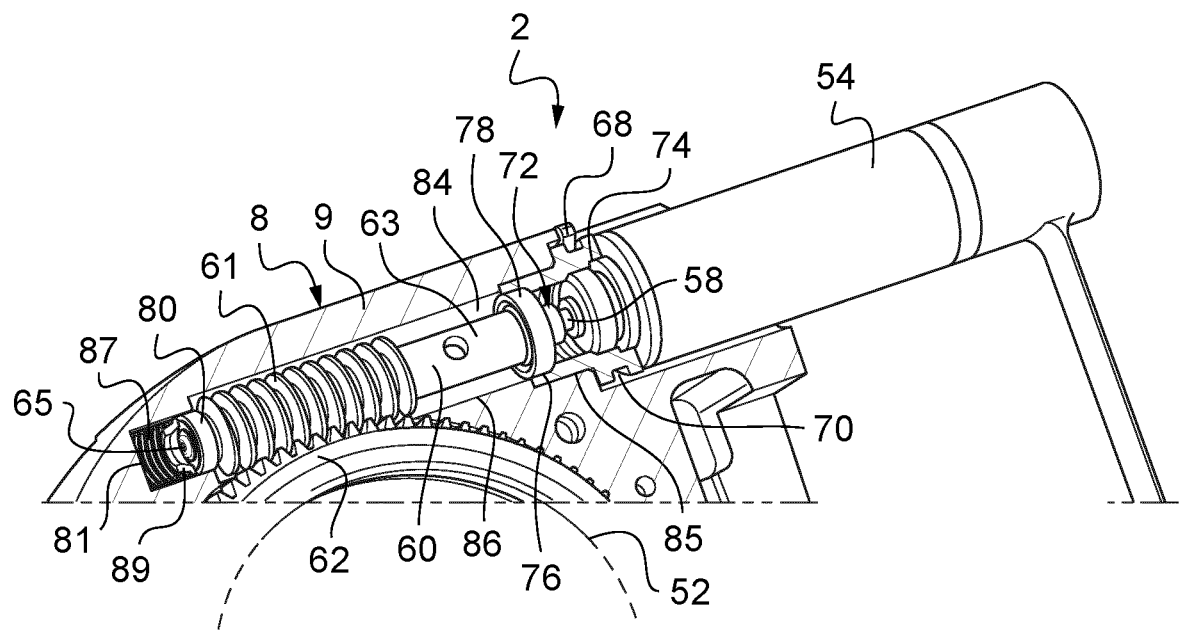
FIG. 4 is a partial view of a second transmission system of the optical device of FIG. 1.
Figure 5:
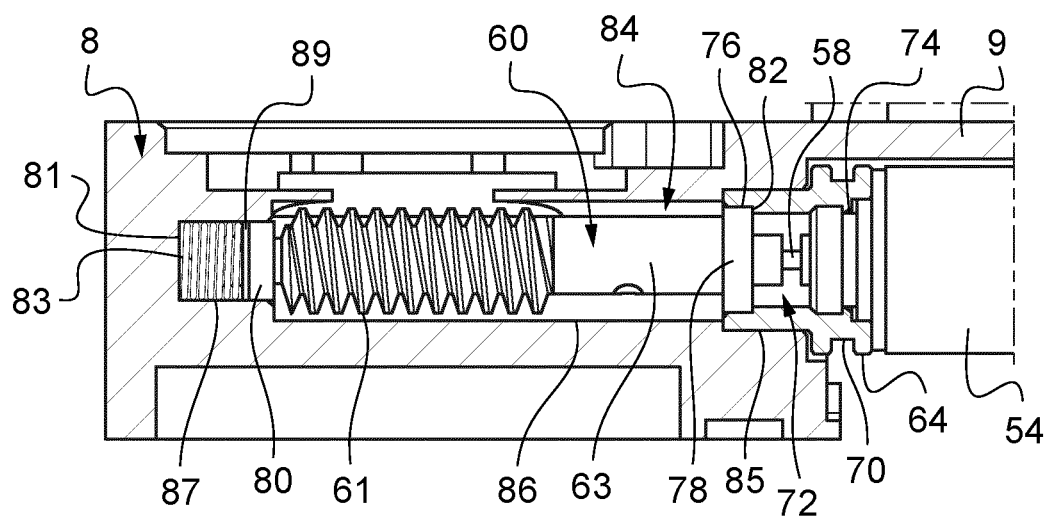
FIG. 5 is a side view of the second transmission system.

FIGS. 4 and 5 show details of the second transmission system 56.

As shown in FIG. 4, the framework 8 also includes here a bushing 64 (in addition to the frame already mentioned). The bushing 64 is for instance made of metal, e.g. stainless steel.

The frame 9 defines a cavity 84 comprising (sequentially along an axis of the cavity 84, from a portion situated near the motor 54 to a portion situated away from the motor 54):

a first cylindrical portion 85 having a fourth diameter;
a second cylindrical portion 86 having a fifth diameter smaller than the third diameter; and, here,
a third cylindrical portion 87 having a sixth diameter smaller than the second diameter.

The bushing 64 is here received in the cavity 84 at the level of the first cylindrical portion 85. A portion of the bushing 64 has a cylindrical shape having a diameter corresponding to the fourth diameter mentioned above. The bushing 64 is for instance affixed to the frame 9 by means of a clip 68 cooperating with a groove 70 formed on the bushing 64.

The bushing 64 defines a through aperture 72 through which the output shaft 58 of the motor 54 and an end of the driving member 60 extend.

The bushing 64 defines a first recess 74 partly receiving the motor 54 and a second recess 76 (situated axially opposite the first recess 74) accommodating a rolling bearing 78.

The second recess 76 defines a ring-shaped wall 82 against which the rolling bearing 78 abuts, as further explained below.

The driving member 60 comprises a first axial portion 63, a second axial portion 65 and a threaded portion 61 separating (i.e. extending between, here along the axis of the driving member 60) the first axial portion 63 and the second axial portion 65.

The second cylindrical portion 86 has a diameter (fifth diameter as mentioned above) larger than the external diameter of the threaded portion 61 of the driving member 60 (for the cavity 84 to accommodate the driving member 60).

The rolling bearing 78 is mounted on the first axial portion 63 of the driving member 60. Precisely here, an end portion of the first axial portion 63 of the driving member 60 is press fit into respective inner races of the rolling bearing 78.

Another rolling bearing 80 is mounted on the second axial portion 65 of the driving member 60. Precisely here, the second axial portion 65 of the driving member 60 is press fit into the inner race of the other rolling bearing 80.

As visible in FIGS. 4 & 5, this rolling bearing 80 is accommodated in the cavity 84, here in the third cylindrical portion 87 of the cavity 84. The external diameter of the rolling bearing 80 corresponds here (in practice is equal to) the diameter of the third cylindrical portion (sixth diameter) so that the rolling bearing 80 may move (by translation along the axis of the driving member 60, i.e. here the axis of the output shaft 58) within the third cylindrical portion 87.

The driving member 60 is thus rotatably mounted in the framework 8 (rotating around an axis of the driving member 60, corresponding here to the output shaft axis).

A coil spring 83 is interposed between an end wall 81 of the cavity 84 (i.e. here an end wall of the third cylindrical portion) and the rolling bearing 80 (precisely here the outer race of the rolling bearing 80).

In the present embodiment, a ring 89 is further interposed between the coil spring 83 and the rolling bearing 80. The circular edge of the ring 89 (circular edge directed towards the rolling bearing 80) contacts only the outer race of the rolling bearing 80, which ensures that the force produced by the compressed coil spring 83 applies only on the outer race of the rolling bearing 80 and not on the inner race of the rolling bearing 80 (which would hinder rotation of the control member 60).

As the coil spring 83 is compressed between the end wall 81 and the rolling bearing 80, the coil spring 83 urges the assembly comprising the driving member 60 and the rolling bearings 78, 80 towards the motor 54 up to abutment of the rolling bearing 76 against the wall 82.

The driving member 60 is consequently maintained in a predetermined axial position along the axis of the output shaft 58 (identical here to the axis of the driving member 60) relative to the framework 8.

The coil spring 83 may for instance be selected so as to exert, along the axis of the output shaft 58, a biasing force greater than a force exerted by the driving member 60 on the control member 62 for driving the control member 62 into motion.

Motion of the control member 62 (here by rotation, resulting in the same rotation of the cylindrical lens 52) can thus be precisely controlled by corresponding motion of the driving member 60 (itself driven by the motor 54). Control of the optical power (here of the cylindrical correction) provided by the cylindrical lens 52 along the lens axis X is thus improved.

The invention claimed is:

1. An optical device comprising:
    a lens and a control member configured such that motion of the control member produces a change in an optical power provided along an optical axis of the lens;
    a framework;
    a motor; and
    a driving member,
    wherein said motor includes an output shaft rotatively coupled to said driving member, the motor and the control member being mounted in the framework such that the driving member and the control member mechanically cooperate,
    wherein the framework defines a cavity including a first cylindrical portion having a first diameter and a second cylindrical portion having a second diameter smaller than the first diameter, said second cylindrical portion accommodating a threaded portion of the driving member,
    wherein the driving member is rotatably mounted in the framework,
    wherein the optical device comprises biasing means for maintaining the driving member in a predetermined axial position along an output shaft axis and relative to the framework,
    wherein the driving member is mounted in the framework by way of at least one rolling bearing, and
    wherein the biasing means are held in contact with a ring shaped wall connecting the first cylindrical portion and the second cylindrical portion to axially urge the driving member and rolling bearing assembly against a framework wall of the framework.

2. The optical device according to claim 1, wherein the driving member is press fit into an inner race of said at least one rolling bearing.

3. The optical device according to claim 1, wherein the biasing means include a coil spring.

4. The optical device according to claim 1, wherein the biasing means include a spring washer.

5. The optical device according to claim 1, wherein said biasing means are suitable for exerting along said output shaft axis a biasing force greater than a force exerted by the driving member on the control member for driving the control member into motion.

6. The optical device according to claim 1, further comprising an encoder associated with the motor for determining an angular position of the output shaft.

7. The optical device according to claim 1, wherein the driving member is a worm screw, wherein the control member is a toothed wheel and wherein the worm screw and the toothed wheel mesh.

8. The optical device according to claim 1, wherein the lens is a cylindrical lens rotatable with the control member.

9. The optical device according to claim 1, wherein said lens is suitable for providing a variable spherical power adjustable by rotation of the control member.

10. The optical device according to claim 1, wherein said biasing means are suitable for exerting along said output shaft axis a biasing force greater than a force exerted by the driving member on the control member for driving the control member into motion.

11. The optical device according to claim 2, wherein said biasing means are suitable for exerting along said output shaft axis a biasing force greater than a force exerted by the driving member on the control member for driving the control member into motion.

12. An optical device comprising:
    a lens and a control member configured such that motion of the control member produces a change in an optical power provided along an optical axis of the lens;
    a motor;
    a driving member; and
    a framework including a frame defining a cavity having a first cylindrical portion having a first diameter, a second cylindrical portion having a second diameter smaller than the first diameter, and a third cylindrical portion having a third diameter smaller than the second diameter,
    wherein said motor includes an output shaft rotatively coupled to said driving member, the motor and the control member being mounted in the framework such that the driving member and the control member mechanically cooperate, and
    wherein the driving member includes a first axial portion, a second axial portion and a threaded portion separating the first axial portion and the second axial portion,
    wherein the first axial portion of the driving member is press fit into an inner race of a rolling bearing such that the driving member is rotatably mounted in the framework,
    wherein biasing means are held between an outer race of the rolling bearing and a ring shaped wall connecting the first cylindrical portion and the second cylindrical portion, and
    wherein a further rolling bearing is mounted on the second axial portion of the driving member and is accommodated in the cavity at a level of the third cylindrical portion.

13. The optical device according to claim 1, wherein said at least one rolling bearing and a second rolling bearing are respectively mounted on two axial portions of the driving member separated by said threaded portion.

14. The optical device according to claim 2, wherein the biasing means are arranged to axially urge an outer race of said at least one rolling bearing against said framework wall.

15. The optical device according to claim 1, wherein the driving member is mounted in the framework by way of said at least one rolling bearing and a second rolling bearing, and wherein the biasing means are held between the second rolling bearing and the ring shaped wall such that said at least one rolling bearing is urged against said framework wall.

16. The optical device according to claim 15, wherein said at least one rolling bearing and the second rolling bearing are mounted on a first axial portion of the driving member, wherein the driving member is also mounted to the framework by way of a further rolling bearing, said further rolling bearing being mounted on a second axial portion of the driving member, the first axial portion and the second axial portion being separated by said threaded portion.

17. The optical device according to claim 16, wherein the cavity comprises a third cylindrical portion having a third diameter smaller than the second diameter, and wherein the further rolling bearing is accommodated in the third cylindrical portion.

18. The optical device according to claim 12, wherein the framework includes a first recess at least partly receiving the motor and a second recess situated opposite the first recess with respect to a through aperture through which the driving member extends, the second recess defining a second ring shaped wall, and wherein the driving member is mounted in the framework by way of another rolling bearing mounted on the first axial portion of the driving member and being in contact with said second ring shaped wall.

* * * * *